H. E. MORTIMER.
DEVICE FOR APPLYING TIRE CHAINS.
APPLICATION FILED OCT. 2, 1916. RENEWED JUNE 20, 1919.

1,313,410.

Patented Aug. 19, 1919.

WITNESS.
Charles A. Becker.

INVENTOR.
Harry E. Mortimer;
BY Rippey & Kingsland
HIS ATTORNEYS

UNITED STATES PATENT OFFICE.

HARRY E. MORTIMER, OF ST. LOUIS, MISSOURI.

DEVICE FOR APPLYING TIRE-CHAINS.

1,313,410.  Specification of Letters Patent.  Patented Aug. 19, 1919.

Application filed October 2, 1916, Serial No. 123,275. Renewed June 20, 1919. Serial No. 305,705.

*To all whom it may concern:*

Be it known that I, HARRY E. MORTIMER, a citizen of the United States, residing at St. Louis, Missouri, have invented a new and useful Device for Applying Tire-Chains, of which the following is a specification.

This invention relates to a device for applying tire chains, and consists in the novel construction hereinafter disclosed.

An object of the invention is to provide a device adapted to be applied to a vehicle wheel for supporting the end of a tire chain, whereby the chain may be carried around the wheel and brought to a position for adjustment without raising the wheel from the road surface. To this end I have designed the device hereinafter described, the construction and application of which is fully illustrated in the accompanying drawing in which—

Heretofore in practice the application of tire chains it has been necessary, in order to apply the chains to the tires, to either raise the wheel from the ground and apply the chains by hand, or to place the chains upon the ground and move the vehicle over the chains and draw the ends together by hand.

Figure 4:
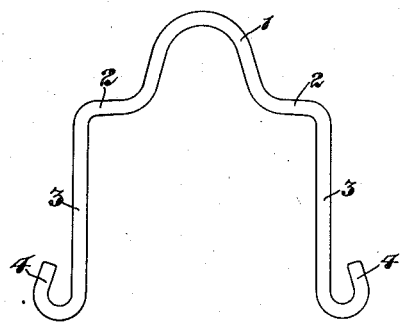
Fig. 4 is a detailed view of the device of the invention.

By the use of the present invention chains may be applied simultaneously if desired to each wheel, and the application may be made without raising the wheels from the ground or without placing the chains about the wheel by hand. The device itself consists of the specially formed instrument illustrated in Fig. 4 which is formed from a straight stretch of wire, it being understood, however, that the device may be made from a cast piece if desired.

In making the device of wire the wire is bent to form a curved part 1 midway between the ends thereof, the arms of the part 1 curving so that said part is in the form of a U-shaped part whose arms are of sufficient length to receive between them one of the spokes 10 when applied thereto. The arms of the part 1 are extended laterally in axial alinement with each other to form the extended portions 2 in the same plane with the part 1 and which are arranged to bear firmly against the inner surface of the felly 11 of the wheel, and constitute a support for holding the chain while the part 1 prevents the support from slipping in any direction on the wheel. The extended portions 2 of the wire are bent at right angles to form legs 3 in the same plane with the arms 2 and the part 1 and are arranged to contact with the sides of the tire 12, extending to the line in which the longitudinal side members of the chain lie. The end of each of the legs 3 is bent to form a hook 4, said hooks being adapted to engage in the open links of the longitudinal side portions of the tire chains 13.

Figure 1:
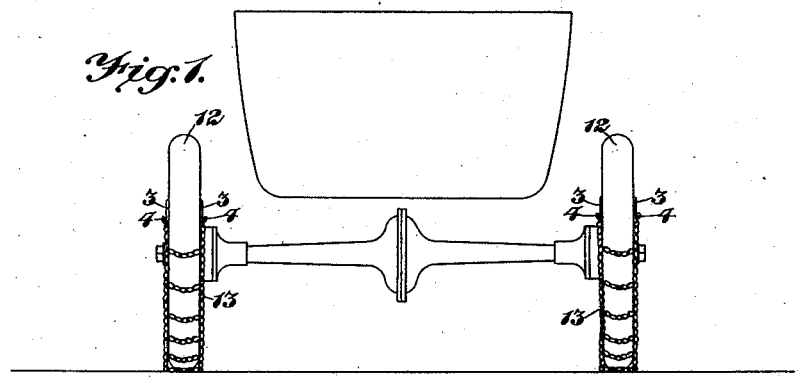
Figure 1 is a view of the rear of a vehicle illustrating the manner in which tire chains are applied by the use of the device of the invention.
Figure 2:
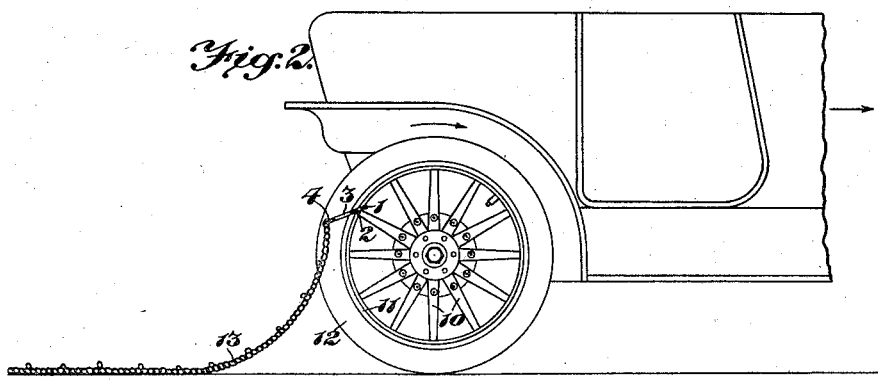
Fig. 2 is a side elevation of the rear of the vehicle illustrating the application of the device in applying tire chains and showing the chain in the initial stage of application.
Figure 3:
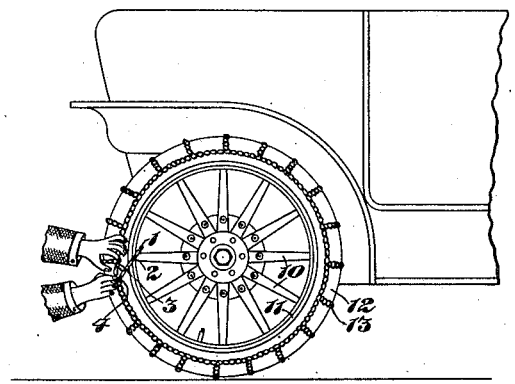
Fig. 3 is a similar view illustrating the final stage of applying the tire by use of the device of the invention.

In practice the device is placed upon the wheel with the part 1 engaging the outer end of a spoke of the wheel, the extended supporting portions 2 engaging against the inner face of the felly and the legs 3 extending outwardly at the sides of the tire so that the hook members 4 lie adjacent to the sides of the tread of the tire. The end links of the longitudinal chains of the tire chain are engaged in the hooks 4 and, as the vehicle is moved forwardly, the wheel is revolved carrying the chain about the tire, which brings the end of the tire chain that is attached to the device to a position so that it may be connected with the opposite end of the chain in the manner illustrated in Fig. 3. When the two ends of the chain are brought together for attachment the device may be removed from the wheel.

Having fully described the invention and the manner in which it is used, what I claim and desire to secure by Letters Patent, is:—

A device of the character described, comprising a wire bent to form a U-shaped portion arranged to engage one of the spokes of the wheel and whose arms are of sufficient length to receive between them the spoke with which the U-shaped portion is engaged; said wire also being bent to provide arms extending outwardly in axial alinement with each other and in the same plane with the U-shaped portion toward opposite sides of the wheel and arranged to bear and support the entire weight of the device and of the chain against the inner surface of the felly of the wheel to which the device is applied; said wire also being bent at right angles from said arms to provide relatively long legs in the same plane in which the said arms and the U-shaped portion lie, the said legs being arranged to extend to the line in which the longitudinal side members of the chains lie and to contact with the sides of the tire of the wheel to which the device is applied; and hooks on the ends of the legs arranged to engage with the links of the longitudinal side members of a tire chain and hold the tire chain so that the same will be wound around the wheel when the wheel is turned.

In witness whereof, I have signed this specification in the presence of two subscribing witnesses.

HARRY E. MORTIMER.

Witnesses:
N. G. BUTLER,
L. C. KINGSLAND.